United States Patent
Chang et al.

(10) Patent No.: US 8,569,193 B2
(45) Date of Patent: Oct. 29, 2013

(54) PREPARATION OF SURFACE FUNCTIONALIZED POROUS ORGANIC-INORGANIC HYBRID MATERIALS OR MESOPOROUS MATERIALS WITH COORDINATIVELY UNSATURATED METAL SITES AND CATALYTIC APPLICATIONS THEREOF

(75) Inventors: Jong-San Chang, Taejeon-si (KR);
Young Kyu Hwang, Taejeon-si (KR);
Sung Hwa Jhung, Daegu-si (KR);
Do-Young Hong, Yongin-si (KR);
You-Kyung Seo, Busan (KR); Gerard Ferey, Versailles cedex (FR); Christian Serre, Versailles cedex (FR)

(73) Assignee: Korean Research Institute of Chemical Technology, Daejeon (KR)

( * ) Notice: Subject to any disclaimer, the term of this patent is extended or adjusted under 35 U.S.C. 154(b) by 591 days.

(21) Appl. No.: 12/600,997

(22) PCT Filed: Dec. 11, 2007

(86) PCT No.: PCT/KR2007/006431
§ 371 (c)(1),
(2), (4) Date: Jun. 15, 2010

(87) PCT Pub. No.: WO2008/143385
PCT Pub. Date: Nov. 27, 2008

(65) Prior Publication Data
US 2010/0273642 A1 Oct. 28, 2010

(30) Foreign Application Priority Data
May 21, 2007 (KR) .................. 10-2007-0049415

(51) Int. Cl.
*B01J 31/00* (2006.01)
(52) U.S. Cl.
USPC ................................ 502/104; 502/152

(58) Field of Classification Search
None
See application file for complete search history.

(56) References Cited

U.S. PATENT DOCUMENTS 7,662,746 B2   2/2010   Yaghi et al.
7,777,061 B2 * 8/2010   Schubert et al. ........... 556/176
(Continued)

FOREIGN PATENT DOCUMENTS

DE    102005060361 A1   6/2007
EP         1362637 A1   11/2003
(Continued)

OTHER PUBLICATIONS

PCT International Search Report for PCT/KR2007/006431, Mailing date Mar. 13, 2008, 2 pages.

(Continued)

*Primary Examiner* — Melvin C Mayes
*Assistant Examiner* — Stefanie Cohen
(74) *Attorney, Agent, or Firm* — Blakely, Sokoloff, Taylor & Zafman LLP

(57) ABSTRACT

Disclosed herein is a method of surface-functionalizing a porous organic-inorganic hybrid material or a organic-inorganic mesoporous material, in which organic substances, inorganic substances, ionic liquids and organic-inorganic hybrid substances are selectively functionalized on the coordinatively unsaturated metal sites of a porous organic-inorganic hybrid material or organic-inorganic mesoporous material, and thus the porous organic-inorganic hybrid material can be used for adsorbents, gas storage devices, sensors, membranes, functional thin films, catalysts, catalytic supports, and the like, and the applications of the surface-functionalized porous organic-inorganic hybrid material prepared using the method to catalytic reactions.

16 Claims, 5 Drawing Sheets

(56) References Cited

U.S. PATENT DOCUMENTS

| | | | |
|---|---|---|---|
| 2006/0252641 | A1 | 11/2006 | Yaghi et al. |
| 2008/0281116 | A1 | 11/2008 | Schubert et al. |

FOREIGN PATENT DOCUMENTS

| | | |
|---|---|---|
| JP | 2004-285315 | 10/2004 |
| JP | 2006-225579 A | 8/2006 |
| KR | 100680767 B1 | 2/2007 |
| WO | WO 2007/068681 A1 | 6/2007 |
| WO | WO 2007068681 A1 * | 6/2007 |

OTHER PUBLICATIONS

Kitagawa, et al., "Functional Porous Coordination Plymers," Angew. Chem. Intl. Ed.; 2004, 43, pp. 2334-2375.

Ferey, et al., "A Chromium Terephthalate-Based Solid with Unusually Large Pore Volues and Surface Area," Science, 2005, 309, pp. 2040-2042.

Sudik, et al., "A Metal-Organic Framework with a Hierarchical System of Pores and Tetrahedral Building Blocks," Angew. Chem. Int. Ed.; 2006 45, pp. 2528-2533.

Maschmeyer, et al., "Derivatised Mesoporous Solids," Curr. Opin. Solid State Mater. Sci., 3 1998, Chem. Lett. 6, 624, 2000, pp. 71-78.

Mueller, et al., "metal-Organic Frameworks—Prospective Industrial Applications," J. Mater. Chem. 16, 2006, pp. 626-636.

Yokoi, et al., "Amino-Functionalized Mesoporous Silica Synthesized by an Anionic Surfactant Templating Route," J. Mater. Chem. 16, 2006, pp. 1125-1135.

Corma, A., "From Microporous to Mesoporous Molecular Sieve Materials and Their Use in Catalysis," Chem. Rev. 97, 1997, pp. 2373-2419.

James, S., "Metal-Organic Frameworks," Chem. Soc. Rev., 32, 2003, pp. 276-288.

EP Application No. 07851402.3, Supplementary European Search Report, Dated Mar. 21, 2012, 8 pages.

Moon, Hoi Ri, et al, "Porous Metal-Organic Framework with Coordinatively Unsaturated Mn II Sites: Sorption Properties for Various Gases," Inorganic Chemistry, vol. 45, No. 21, Received Jun. 29, 2006, pp. 8672-8676.

* cited by examiner

PREPARATION OF SURFACE FUNCTIONALIZED POROUS ORGANIC-INORGANIC HYBRID MATERIALS OR MESOPOROUS MATERIALS WITH COORDINATIVELY UNSATURATED METAL SITES AND CATALYTIC APPLICATIONS THEREOF

CROSS-REFERENCE TO RELATED APPLICATIONS

This patent application is a U.S. National Phase application under 35 U.S.C. §371 of International Application No. PCT/KR2007/006431, filed on Dec. 11, 2007, entitled PREPARATION OF SURFACE FUNCTIONALIZED POROUS ORGANIC-INORGANIC HYBRID MATERIALS OR MESOPOROUS MATERIALS WITH COORDINATIVELY UNSATURATED METAL SITES AND CATALYTIC APPLICATIONS THEREOF, which claims priority to Korean patent application number 10-2007-0049415, filed May 21, 2007.

TECHNICAL FIELD

The present invention relates to a nanoporous material having a large surface area, and, to a method of selectively functionalizing organic substances, inorganic substances, ionic liquid and organic-inorganic hybrid substances on the coordinatively unsaturated metal sites of the nanoporous material in a stepwise way, and catalytic applications of a surface-functionalized nanoporous material prepared therefrom.

The present invention relates to a method of surface modification of a porous organic-inorganic hybrid material, in which organic substances, inorganic substances, ionic liquid and organic-inorganic hybrid substances are selectively functionalized in the coordinatively unsaturated metal sites (referred to as "open metal sites") of a porous organic-inorganic hybrid material or meso porous material in a stepwise way (also referred to as "a metal organic framework"). The porous organic-inorganic hybrid material can be used for adsorbents, gas storage materials, sensors, membranes, functional thin films, catalysts, catalytic supports, and the like, and to the application of the surface-functionalized porous organic-inorganic hybrid material, prepared therefrom.

BACKGROUND ART

Generally, coordinatively unsaturated metal sites are the locations where water or organic solvents are removed and thus organic metal compounds can form covalent or coordinate bonds.

A porous organic-inorganic hybrid material, is defined as a porous organic-inorganic polymer compound, formed by bonding an organic ligand with a central metal ion, and it is a crystalline compound which includes both organic building blocks and inorganic substances in its backbone structure and has a molecular-sized or a nano-sized pore structure. A porous organic-inorganic hybrid material is a broadly defined term, and generally refers to as a porous coordination polymer (Angew. Chem. Intl. Ed., 43, 2334. 2004), and also refers to as a metal-organic framework (Chem. Soc. Rev., 32, 276, 2003). Research into these materials has been newly advanced through the combination of the molecular engineering and material science. Furthermore, these materials have a large surface area, and molecular-sized or nano-sized pores, and can thus be used for adsorbents, gas storage materials, sensors, membranes, functional thin films, catalysts, catalytic supports, and the like. Accordingly, in recent years, research into these materials has been actively conducted.

An organic-inorganic mesoporous hybrid material is defined as an ordered molecular structure having a mesopore distribution in the range of 2 to 50 nm which is substituted with dissimilar metals, and thus has a coordinatively unsaturated metal sites. It was reported (Chem. Rev. 97, 2373, 1997) that the organic-inorganic hybrid mesoporous material can be widely applied to catalysts, catalytic supports, adsorbents and functional materials.

The general surface functionalizing methods for imparting applicability to the organic-inorganic mesoporous material having a large surface area, were reported in a research paper (Curr. Opin. Solid State Mater. Sci. 3, 71, 1998, Chem. Lett. 6, 624, 2000). The method involves bonding on the surface of a porous organic-inorganic hybrid material or mesoporous material by the covalent bond between an organic metal compound, for example, organic silaneand a previously-prepared hydroxide group (—OH) of the surface of it. In addition to the said method, a method of directly functionalizing the surface of a hybrid material by mixing an organic silane compound with a precursor of the mesoporous material was reported (J. Mater. Chem. 16, 1125, 2006).

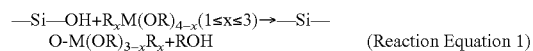

—Si—OH+R$_x$M(OR)$_{4-x}$(1≤x≤3)→—Si—O-M(OR)$_{3-x}$R$_x$+ROH    (Reaction Equation 1)

However, methods of selectively functionalizing the coordinatively unsaturated metal sites of the porous organic-inorganic hybrid material having few or no hydroxyl groups on the surface thereof, or the coordinatively unsaturated metal sites of the organic-inorganic mesoporous material substituted with dissimilar metals have not been reported yet.

Meanwhile, various heterogeneous catalytic reactions using organic-inorganic nano hybrid material itself have been reported recently (J. Mater. Chem. 16, 626, 2006). However, the heterogeneous catalytic reactions conducted by functionalizing the coordinatively unsaturated metal sites of a porous organic-inorganic hybrid material have not been reported so far.

SUMMARY OF INVENTION

The present invention has been aimed to overcome the above problems occurring in the prior art, thus the object of the present invention is to provide a method of preparing a porous organic-inorganic hybrid material or organic-inorganic mesoporous material formed by selectively functionalizing organic substances, inorganic substances, ionic liquid and organic-inorganic hybrid substances in a stepwise way on the unsaturated metal sites rather than the hydroxylgroups of the surface of the porous organic-inorganic hybrid material or organic-inorganic mesoporous material, and to apply said porous organic-inorganic hybrid material or organic-inorganic mesoporous hybrid material to heterogeneous catalytic reactions.

Another objective of the present invention is to provide the surface-functionalized porous organic-inorganic hybrid material prepared using the method, which can be used for adsorbents, gas storage materials, sensors, membranes, functional thin films, catalysts, catalytic supports, and the like.

A further object of the present invention is to provide a catalyst composition for acid or base reaction, hydrogenation, dehydrogenation, carbon-carbon bonding reaction or oxidation reaction using the surface-functionalized porous organic-inorganic hybrid material or porous mesoporous organic-inorganic hybrid material.

TECHNICAL SOLUTION

In order to accomplish the above objectives, the present invention provides a method of preparing a surface-functionalized porous organic-inorganic hybrid material characterized in reacting a porous organic-inorganic hybrid material or a mesoporous organic-inorganic material having unsaturated metal sites, with one or more selected from organic substances, inorganic substances, ionic liquids and organic-inorganic hybrid substances, and provides a catalyst and composition thereof using the surface-functionalized porous organic-inorganic hybrid material prepared by the method. The method is characterized in that a porous organic-inorganic hybrid material or a mesoporous organic-inorganic material is functionalized on its surface by selectively coordinately bonding or covalently bonding one or more selected from among silane, organic metal compounds and polyoxometalate to unsaturated metal sites, rather than the hydroxyl group, of the surface of the porous organic-inorganic hybrid material or the mesoporous organic-inorganic material.

A porous organic-inorganic hybrid material is a porous crystalline polymer compound formed by bonding an organic ligand with a central metal ion, and a organic-inorganic mesoporous material is a molecular sieve having coordinatively unsaturated metal sites formed by substitution of dissimilar metals. A organic-inorganic mesoporous material is an ordered molecular sieve having a pore distribution of about 2~50 nm, and the porous organic-inorganic hybrid material generally has pores having a size of molecular scale or several nanometers.

The method of the present invention may further include the step of supporting one or more metals selected from among precious metals, transition metals, and oxides thereof on the surface-functionalized porous organic-inorganic hybrid material, after the step of functionalizing the surface of the porous organic-inorganic hybrid material or mesoporous organic-inorganic material with one or more selected from among organic substances, inorganic substances, ionic liquids and organic-inorganic hybrid substances.

Furthermore, the method of the present invention may further include the step of conducting a heterogeneous catalytic reaction using the surface-functionalized porous organic-inorganic hybrid material or mesoporous organic-inorganic material of the present invention.

In one embodiment, the porous organic-inorganic hybrid material can be prepared through a method of heating a reactant mixture solution including a metal source, an organic substance serving as a ligand, and a solvent, but is not limited thereto. The method of heating may be selected from, but is not limited to, a conventional heating method, a microwave irradiation method, an electrolytic method and a sonic wave irradiation method. However, the conventional heating method or the microwave irradiation method is preferred as the method of heating a reactant mixture solution in order to prepare the crystals of a nanoporous organic-inorganic hybrid material.

Any metal may be used as metals constituting the porous organic-inorganic hybrid material, and in one embodiment Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Mg, Ca, Sr, Ba, Sc, Y, Al, Ga, In, Tl, Si, Ge, Sn, Pb, As, Sb, Bi and the like may be used. In a further embodiment, transition metals that can easily form coordinate compounds can be used as the metals constituting the porous organic-inorganic hybrid material. In the other embodiment, among the transition metals, chromium, vanadium, iron, nickel, cobalt, copper, titanium, aluminum, manganese, and the like may be used. In another embodiment, chromium, iron, aluminum and vanadium, may be used. In addition to the transition metals, typical elements that can form coordinate compounds such as aluminum, silicon, cerium, and lanthanum, and the like may be used. Metals and any metal compounds may be used as the metal source.

The organic substance, which is another constituent of the porous organic-inorganic hybrid material, also refers to as a linker. Any organic substance having coordinatively bondable functional groups may be used as the linker. Examples of the coordinatively bondable functional groups may include a carboxylic acid group, carboxylic acid anion group, amino group (—$NH_2$), imino group

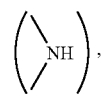

amide group (—$CONH_2$), sulfonic acid group (—$SO_3H$), sulfonic acid anion group (—$SO_3^-$), methanedithionic acid group (—$CS_2H$), methanedithionic acid anion group (—$CS_2^-$), pyridine group, pyrazine group, and the like. In order to induce a more stable organic-inorganic hybrid material, it is advantageous to use organic substances having two or more chealating sites, such as bidentate and tridentate. As the organic substances, if they have coordinatively bondable sites, may include neutral organic substances, such as bipyridine, pyrazine and the like, anionic organic substances of carboxylic acid anion, such as terephthalate, naphthalene dicarboxylate, benzene tricarboxylate, glutarate, succinate and the like, and also cationic organic substances may be used. As carboxylic acid anions, compound having an aromatic ring, such as terephthalate, linear carboxylic acid anions, such as formate, and anions having a non-aromatic ring, such as cyclohexyldicarbonate, may be used. Organic substances having deprotonation position and those compounds which can coordinate under certain reaction conditions may be used. That is, even if an organic acid, such as terephthalic acid, is used, it can be bonded with metal components as a terephthalate after the reaction. Typical examples of the organic substances may include organic acids, such as benzene dicarboxylic acid, naphthalene dicarboxylic acid, benzene tricarboxylic acid, naphthalene tricarboxylic acid, pyridine dicarboxylic acid, bipyridyl dicarboxylic acid, formic acid, oxalic acid, malonic acid, succinic acid, glutaric acid, hexanedioic acid, heptanedioic acid, cyclohexyl dicarboxylic acid, and anions thereof; bipyridine; and pyrazine. Further, mixtures of two or more organic substances may used.

In the preparation of the organic-inorganic hybrid material other than metal sources and organic substances, suitable solvents are required. Example of the solvents may include water; alcohols, such as methanol, ethanol, propanol and the like; ketones, such as acetone, methylethyl ketone and the like; hydrocarbons, such as hexane, heptane, octane and the like; and ionic liquids. In the further embodiment, mixtures of two or more solvents may be used, and in other embodiment water may be used.

Typical examples of the porous organic-inorganic hybrid material may include chromium terephthalate, vanadium terephthalate, iron terephthalate, and aluminum terephthalate. Among them, porous organic-inorganic hybrid materials having macropores, such as MIL-100 (Angew. Chem. Int. Ed. 43, 6296, 2004), MIL-101 (Science, 309, 2040, 2005) and MOF-500 (Angew. Chem. Int. Ed. 45, 2528, 2006), are most suitable.

The porous organic-inorganic hybrid material may be in a form of thin film structure or a membrane. The porous organic-inorganic hybrid material in a form of a thin film a membrane, pellet, ink, extrudate, or sphere can be prepared by immersing a substrate surface-treated with alumina, silicon, glass, indium-tin oxide (ITO), indium-zinc oxide (IZO), or a heat-resistant polymer into a reactant mixture solution.

Further, examples of the organic-inorganic hybrid material having coordinatively unsaturated metal sites may include MCM-41, SBA-15, and MSU-H which are substituted with dissimilar metals such as B, Al, In, Ga etc. and have a hexagonal pore system, or SBA-16, SBA-1, and FDU-1, MCM-48 with a three-dimensional cubic pore system.

Further, compounds which can be bonded to coordinatively unsaturated metal sites may be the one or more selected from among organic substances, inorganic substances, ionic liquids, and organic-inorganic hybrid substances. The organic substance may be one or more selected from among the compounds represented by Formulas 1 to 3 below:

$$H_2N\text{-}M\text{-}R1 \quad\quad [\text{Formula 1}]$$

$$HS\text{-}M\text{-}R2 \quad\quad [\text{Formula 2}]$$

$$(OH)_2OP\text{-}M\text{-}R3 \quad\quad [\text{Formula 3}]$$

wherein M is an alkylene or aralkylene group of $C_1$~$C_{20}$ including or not including unsaturated hydrocarbons, and each of R1, R2 and R3 is independently an organic alkylene or aralkylene group, unsubstituted or substituted with one or more selected from among halogen elements, a vinyl group (—C=$CH_2$), an amino group (—$NH_2$), an imino group (—$NHR^{14}$), a mercapto group (—SH), a hydroxyl group (—OH), a carboxylic acid group (—COOH), a sulfonic acid group (—$SO_3H$), an alkoxy group (—OR) and a phosphoric group (—PO$(OH)_2$).

Further, as the inorganic substance, polyoxometallate of $[AlO_4Al1_2(OH)_{24}(H_2O)_{12}]^{7+}$ or $[PW_{12}O_{40}]^{4-}$ may be used. The polyoxometallate may include a structure of Keggin anion $[(XM_{12}O_{40})^{n-}$, where n is an integer of 1~10; X is P, Si, H, Ga, Ge, V, Cr, Me or Fe; and M is one or more selected from among W, Mo, and Co], a structure of Lindqvist anion $[(M_6O_{19})^{n-}$, where n is an integer of 1~10; and M is W, Mo, Ta, V or W], a structure of Anderson-Evans anion $[(M_x(OH)_6 M_6O_{18})^{n-}$, where n is an integer of 1~10; Mx is Cr, Ni, Fe, or Mn; and M is Mo, or W] or $[(M_4(H_2O)_4(P_2W_{15}O_{56})_2)^{n-}$, where n is an integer of 1~10; and M is one or more transition metals or transition metal clusters selected from among Cu, Zn, Ni, Mn, and the like], and Dawson-Wells structure $(P_2W_{15}O_{56})_2$.

The ionic liquids may be one or more salts selected from among ammonium, phosphonium, sulphonium, pyrrolidinium, imidazolium, thiazolium, pyridium and triazolium. Further, the organic-inorganic hybrid substances may be organic metal compounds. Among the organic metal compounds, compounds containing organic silicon may be chiefly used as organic silane compounds. Specific examples of the organic silane compounds may include silylating agents, silane coupling agents, silane polymers, and mixtures thereof.

Among the surface functionalizing materials, organic silane compounds can be easily bonded to the coordinatively unsaturated metal sites of the porous organic-inorganic hybrid material or mesoporous organic-inorganic material and are stable after bonding. Among the organic silane compounds, an organic silane compound, having an alkoxy group at one side thereof and having an alkyl group, an alkenyl group and an alkynyl group having a functional group selected from an amino group and a mercapto group at the other side, can form stable bonds with the porous organic-inorganic hybrid material or mesoporous organic-inorganic material and has high catalytic activity.

Further, the organic-inorganic hybrid substance is one or more selected from among compounds represented by Formulas 4 to 11 below:

$$Si(OR^1)_{4-x}R_x (1 \leq x \leq 3) \quad\quad [\text{Formula 4}]$$

$$Si(OR^3)_{4-(y+z)}R^2_y Z_z (1 \leq y+z \leq 3) \quad\quad [\text{Formula 5}]$$

$$Si(OR^4)_{4-a}R^5_a Si (1 \leq a \leq 3) \quad\quad [\text{Formula 6}]$$

$$Z^1_b(OR^6)_{3-b}Si\text{-}A\text{-}Si(OR^7)_{3-c}Z^2_c (0 \leq b \leq 2, 0 \leq c \leq 2) \quad\quad [\text{Formula 7}]$$

$$R^8_e M^1(OR^9)_{4-e} (1 \leq e \leq 3) \quad\quad [\text{Formula 8}]$$

$$R^{10}_g M^2 Z^3_f(OR^{11})_{4-(f+g)} (1 \leq f+g \leq 3) \quad\quad [\text{Formula 9}]$$

$$M^3(OR^{12})_h (1 \leq h \leq 2) \quad\quad [\text{Formula 10}]$$

$$M^4(OR^{13})_i Z^4_j (1 \leq i+j \leq 2) \quad\quad [\text{Formula 11}]$$

wherein A is an alkylene or aralkylene group of $C_1$~$C_{20}$ including or not including unsaturated hydrocarbons, each of $Z^1$, $Z^2$, $Z^3$ and $Z^4$ is independently selected from among halogen elements, each of $M^1$ and $M^2$ is independently one or more elements selected from among transition metals, Lanthanides and Actinides, each of $M^3$ and $M^4$ is independently one or more elements selected from among alkali metals and alkaline earth metals, each R and $R^1$ to $R^{13}$ is independently an alkyl group, alkenyl group or alkynyl group of $C_1$~$C_{20}$, unsubstituted or substituted with one or more selected from among halogen elements, a vinyl group (—C=$CH_2$), an amino group (—$NH_2$), an imino group (—$NHR^{14}$), a mercapto group (—SH), a hydroxyl group (—OH), and a carboxylic acid group (—COOH), or is selected from among a vinyl group (—C=CH), an amino group (—$NH_2$), an imino group (—$NHR^{14}$), a mercapto group (—SH), a hydroxyl group (—OH) and a carboxylic acid group (COOH), and $R^{14}$ is an alkyl group, an alkenyl group or an alkynyl group of $C_1$~$C_{10}$, unsubstituted or substituted with halogen, an amino group, a mercapto group or a hydroxyl group.

When functionalizing the porous organic-inorganic hybrid material or mesoporous organic-inorganic material with two or more selected from among organic substances, inorganic substances, ionic liquids and organic-inorganic hybrid substances, the mixtures of two or more substances may be used, or the method sequentially using other substances after the use of one of the substance may be used. In one embodiment, the porous organic-inorganic hybrid material or mesoporous organic-inorganic material is first reacted with organic substances or organic metal compounds, and in the second step subsequently reacted with ionic liquids or inorganic polyoxometallates, thereby preparing a surface-functionalized porous organic-inorganic hybrid material or mesoporous organic-inorganic material. This method is advantageous in that the dissolution of metals, which are active materials, can be prevented when functional groups are secondarily supported with the metals.

Before the surface functionalization of the porous organic-inorganic hybrid or mesoporous organic-inorganic material, a pretreatment process of removing water or a solvent bonded to the coordinatively unsaturated metal sites thereof may be performed. In the pretreatment process, any method may be used as long as water or a solvent can be removed without causing the deformation of the surface functionalization of the porous organic-inorganic hybrid material or mesoporous organic-inorganic material. In one embodiment, the porous organic-inorganic hybrid material or mesoporous organic-inorganic material may be heated at a temperature of 100° C. or more for more than 2 hours. In the further embodiment, the porous organic-inorganic hybrid material may be heated at a temperature of 150° C. or more for more than 4 hours, under reduced pressure.

A method of preparing a surface-functionalized porous organic-inorganic hybrid material according to an embodiment of the present invention may include the steps of (a) removing an organic solvent, such as water ($H_2O$), alcohol or the like, coordinatively bonded to the coordinatively unsaturated metal sites of the surface of the porous organic-inorganic hybrid material or mesoporous organic-inorganic material substituted with dissimilar metals; (b) functionalizing the pretreated porous organic-inorganic hybrid material or organic-inorganic mesoporous material by putting it into a solution formed by dissolving organic substances, inorganic substances, ionic liquids and organic-inorganic hybrid substances in a solvent and then refluxing the mixed solution; and (c) refining the porous organic-inorganic hybrid material or organic-inorganic mesoporous material functionalized with the organic metal compounds.

When the porous organic-inorganic hybrid material or organic-inorganic mesoporous material is surface-functionalized using high volatile organic substances, silane or an organic metal compound, by contacting gaseous silane or an organic metal compound with the porous organic-inorganic hybrid material or mesoporous organic-inorganic material, it can be selectively bonded to the coordinatively unsaturated metal sites of the porous organic-inorganic hybrid material or mesoporous organic-inorganic material.

In the method of preparing a surface-functionalized porous organic-inorganic hybrid material and organic-inorganic mesoporous material, in order to apply to heterogeneous catalysts, sensors and the like, the porous organic-inorganic hybrid material or the mesoporous organic-inorganic material surface-functionalized with organic groups, silane, organic metal compounds, ionic liquids or polyoxometallates may be supported and fixed with one or more selected from among precious metals, transition metals, typical metals, Lanthanide, or oxides thereof. The precious metals may include single metals, such as Pd, Au, Pt, Ru, and the like, and composite metals. The transition metals may include Ti, Zr, V, Fe, Ni, Nb, W, Mo, Ta, Mn, and the like. The method of fixing by supporting one or more selected from among precious metals, transition metals, typical metals, Lanthanide, or oxides thereof may be conducted using general methods. In one embodiment, the compounds including precious metals, transition metals, typical metals or lanthanide may be reduced in a solution using a reductant and then supported, or the compound may be directly supported. Further, the compounds may be supported in the form of metal oxides.

The present invention provides a surface-functionalized porous organic-inorganic hybrid material or organic-inorganic mesoporous material prepared using the method. Further, the present invention provides a catalyst composition including the surface functionalized porous organic-inorganic hybrid material or organic-inorganic mesoporous material prepared using the method. In this case, the catalyst composition may be used for an acid or base reaction, hydrogenation, dehydrogenation, carbon-carbon bonding reaction, or oxidation reaction by oxygen, air or hydrogen peroxide.

In one embodiment, the porous organic-inorganic hybrid material or organic-inorganic mesoporous material first surface-functionalized with organic groups, silane, organic metal compounds, ionic liquids or polyoxometallates and secondarily supported with one or more selected from among precious metals, transition metals or metal oxides thereof may be used as the catalyst composition for hydrogenation, dehydrogenation or carbon-carbon bonding or the catalyst composition for oxidation.

The catalyst composition according to the present invention is a composition containing the surface-functionalized porous organic-inorganic hybrid material or organic-inorganic mesoporous material prepared using the methods. In the catalyst composition, the surface-functionalized porous organic-inorganic hybrid material or organic-inorganic mesoporous material may be independently used, and may be used in a mixture of other catalyst components. Further, the catalyst composition may be prepared by mixing the surface-functionalized porous organic-inorganic hybrid material or organic-inorganic mesoporous material with a substrate material, and may be prepared by coating a substrate with the surface-functionalized porous organic-inorganic hybrid material or organic-inorganic mesoporous material.

As described above, according to the present invention, it can be seen that, since the coordinatively unsaturated metal sites of a porous organic-inorganic hybrid material or organic-inorganic mesoporous material are surface-functionalized, the surface of the hybrid material having few or no hydroxy groups, can be functionalized with organic functional groups, inorganic functional groups, or organic-inorganic hybrid functional groups. Further, it can be seen that the method of functionalizing the porous organic-inorganic hybrid material or organic-inorganic mesoporous material according to the present invention is advantageous in that it is very rapid in the view of kinetics and has high selectivity, compared to conventional methods of functionalizing on the hydroxy groups of the surface of porous materials with organic-inorganic compounds.

This surface-functionalized porous organic-inorganic hybrid material or organic-inorganic mesoporous material can be used to manufacture various catalysts, catalytic supports, adsorbents, gas storage devices, ion-exchange reactors, nanoreactors, and nanomaterials. In particular, this surface-functionalized porous organic-inorganic hybrid material can be used for electronic materials, chiral catalysts, sensors, photoelectric materials, and medical materials in the future.

DETAILED DESCRIPTION

Hereinafter, the present invention will be described in more detail with reference to Examples.

Preparation Example 1

Preparation of Porous Organic-Inorganic Hybrid Material (MIL-101)

A porous organic-inorganic hybrid material (MIL-101) having a pore size of 1 nm or more was prepared (Science, 309, 2040, 2005).

Figure 1:
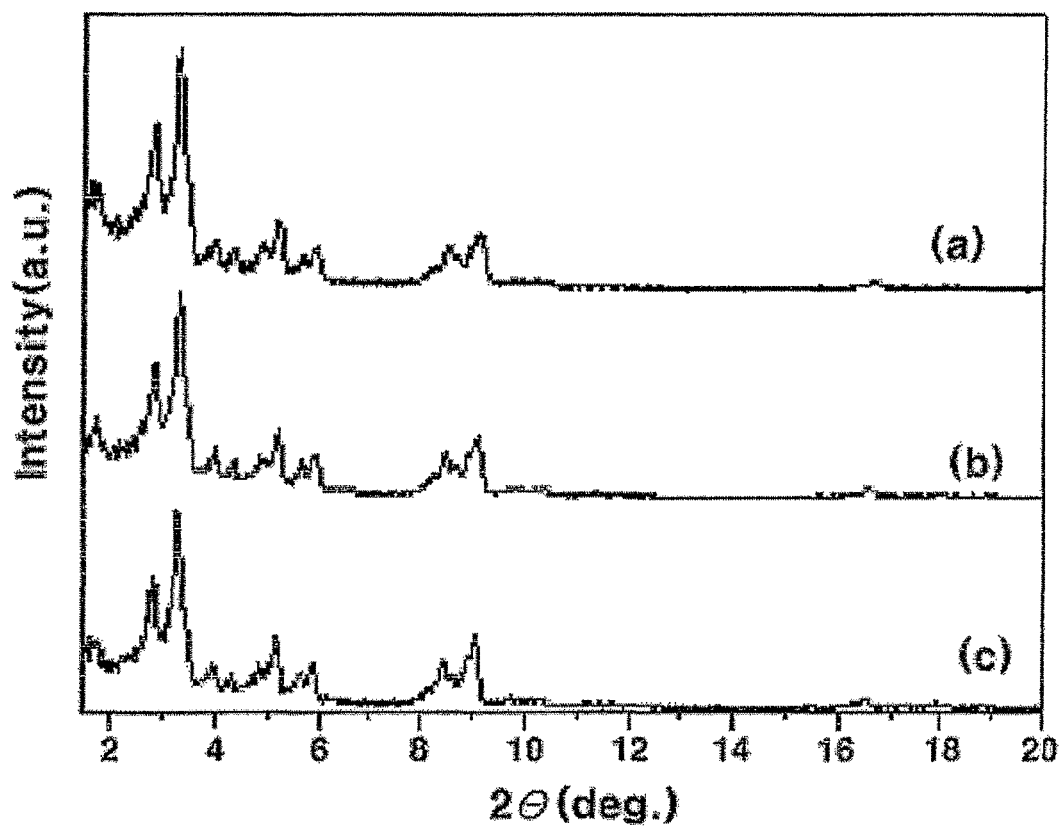
FIG. 1 is a graph showing XRD patterns of a surface-functionalized porous organic-inorganic hybrid material, in which (a) shows the XRD pattern of MIL-101 prepared in Preparation Example 1, (b) shows the XRD pattern of ED-MIL-101 of Example 1, and (c) shows the XRD pattern of DETA-MIL-101 of Example 2.
Figure 2:
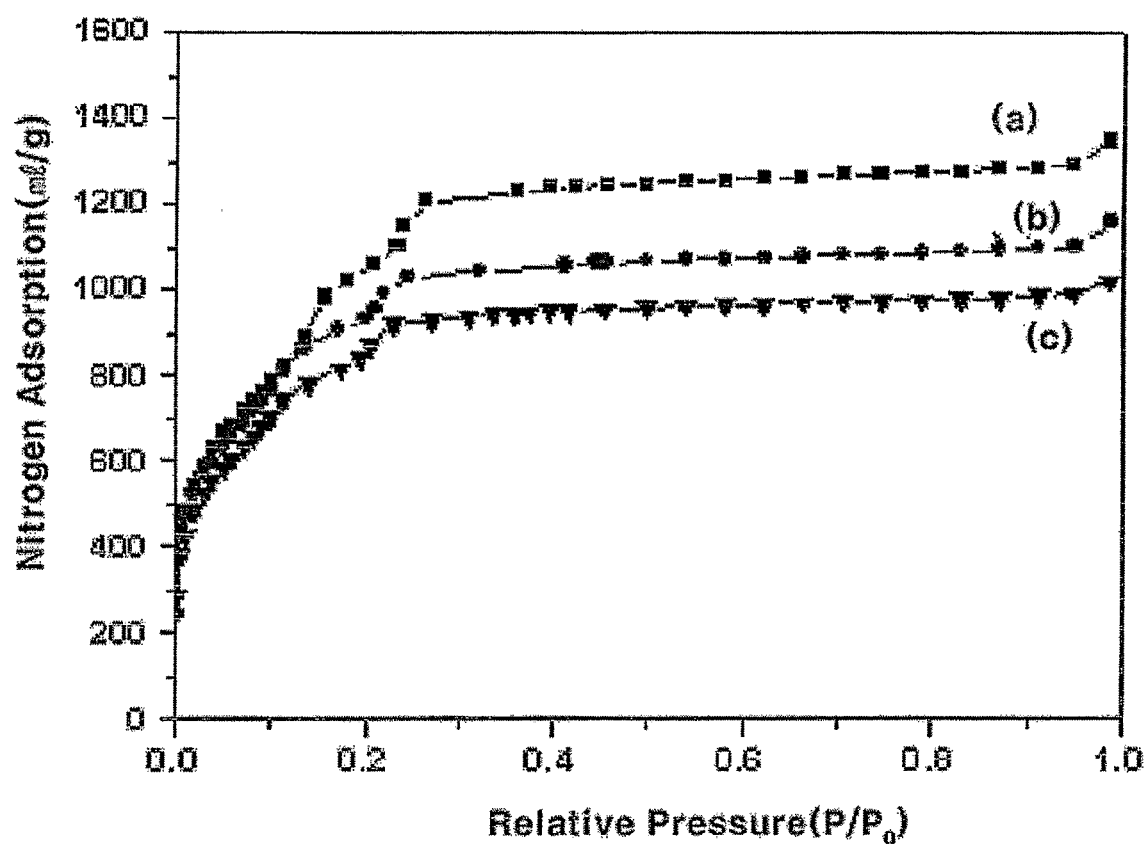
FIG. 2 is a graph showing nitrogen adsorption isotherms of a surface-functionalized porous organic-inorganic hybrid material, in which (a) shows the nitrogen adsorption isotherm of MIL-101 prepared in Preparation Example 1, (b) shows the nitrogen adsorption isotherm of ED-MIL-101 of Example 1, and (c) shows the nitrogen adsorption isotherm of DETA-MIL-101 of Example 2.

Reactant mixtures with the molar composition for Cr:HF:BDCA:$H_2O$=1:1:1:275 were prepared from $Cr(NO_3)_3 \cdot 9H_2O$, aqueous HF, 1,4-benzenedicarboxylic acid (BDCA) and water. The reactant mixtures were loaded in Teflon reactor, Subsequently, the reactant mixture was heated in an oven at a temperature of 220° C. for 8 hours to react, was cooled to room temperature, was separated using a centrifugal separator, was cleaned using distilled water, and was then dried at a temperature of 110° C., thereby obtaining the porous organic-inorganic hybrid material (MIL-101). The X-ray diffraction patterns (XRD patterns) of solids corresponded to those of the reported research (Science 2005, 309, 2040). The XRD pattern and oxygen adsorption isotherm of the obtained porous organic-inorganic hybrid material crystal are shown in (a) of FIG. 1 and (a) of FIG. 2, respectively.

Preparation Example 2

APS-SBA-15 Functionalized with Amino Group and Base Catalytic Reaction

SBA-15, which is a hexagonal silica mesoporous material, was prepared using a commonly known method, described in the document "J. Phys. Chem. 106, 255, 2002". It was found that the XRD pattern of the baked SBA-15 was identical to that reported in the document. In Preparation Example 2, a porous material functionalized with an amino group (APS-SBA-15) was prepared as in Example 1, except that SBA-15, which is a mesoporous material, rather than an organic-inorganic hybrid material, was functionalized. As the result of a Knoevenagel condensation reaction, APS-SBA-15 was found to exhibit lower catalytic reactivity than $NH_2$-MIL-101 in the same reaction time. The reason for this is that —$NH_2$ group of $NH_2$-MIL-101 was more activated than APS-SBA-15 (refer to Table 1).

Example 1

Figure 3:
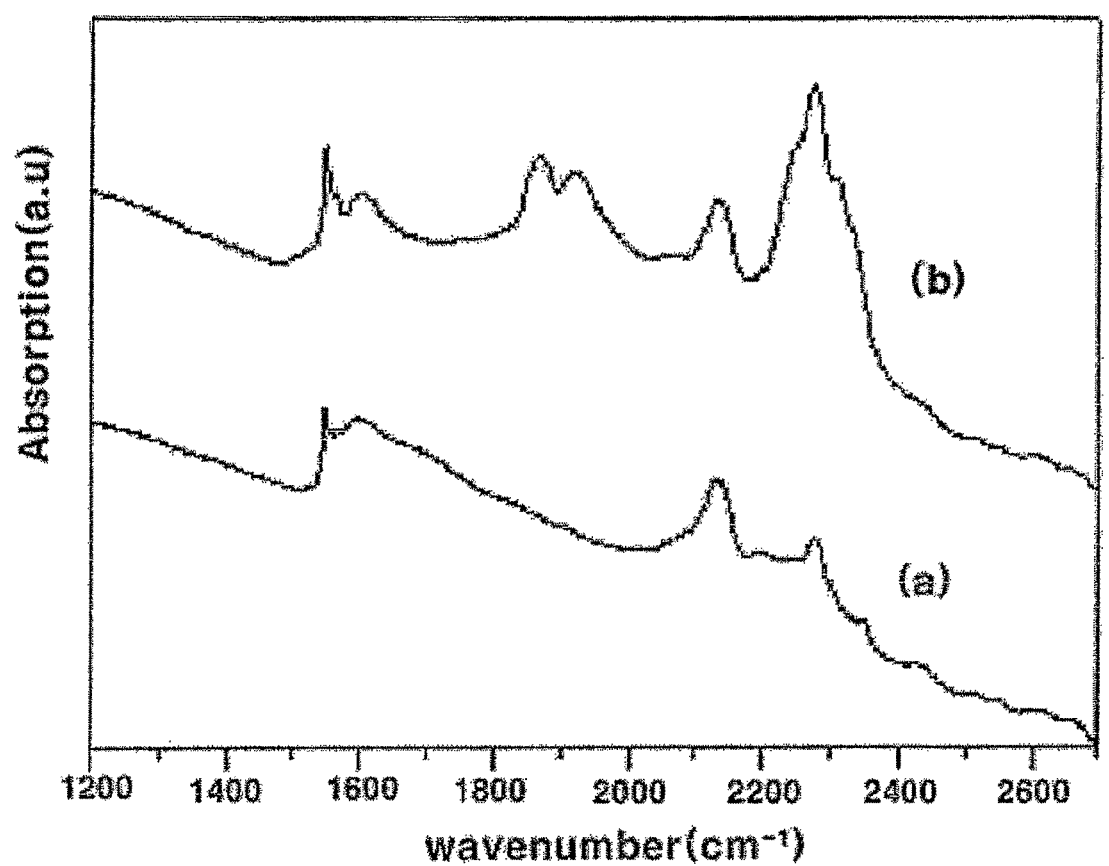
FIG. 3 is a graph showing infrared spectra of a surface-functionalized porous organic-inorganic hybrid material, in which (a) shows the infrared spectrum of MIL-101 of Preparation Example 1, and (b) shows the infrared spectrum of ED-MIL-101 of Example 1.

ED-MIL-101 Functionalized with Amino Group 1 g of MIL-101, prepared in Preparation Example 1, was pretreated in a vacuum oven at a temperature of 200° C. for 12 hours to remove water coordinatively bonded to the coordinatively unsaturated metal sites thereof. Subsequently, 1 g of the dehydrated MIL-101 was put in a mixed solution of 2 ml of ethylenediamine (ED) and 48 ml of toluene. Subsequently, the mixed solution was refluxed at a temperature of 110° C. for 12 hours, separated by a paper filter, and then dried in an oven at a temperature of 110° C., thereby preparing a porous organic-inorganic hybrid material in which an amino group is coordinatively bonded to the coordinatively unsaturated metal sites thereof. From the X-ray diffraction pattern before/after the porous organic-inorganic hybrid material was supported with ethylenediamine, it could be seen that a material having the same structure as pure MIL-101 was obtained, as shown in (b) of FIG. 1. Further, from the result of nitrogen adsorption, it could be seen that the amount of adsorbed nitrogen was decreased, as shown in (b) of FIG. 2. Further, the fact that ethylenediamine was coordinated can be confirmed by the fact that the amino group (—$NH_2$) and ethyl group (—$CH_2CH_2$—) of the ethylenediamine were present in the frequency range of 2800~3000 $cm^{-1}$ and in the frequency range of 3200~3400 $cm^{-1}$, as shown in FIG. 3. Further, from the fact that the hydroxyl group (—OH group) of the porous organic-inorganic hybrid material before/after the coordination of ethylenediamine was changed barely in the frequency range of 3550~3650 $cm^{-1}$, as shown in (a) of FIG. 3, it can be seen that the ethylenediamine was selectively bonded to the coordinatively unsaturated metal sites of the porous organic-inorganic hybrid material, as shown in (b) of FIG. 3

Example 2

DETA-MIL-101 Functionalized with Triamino Group

In Example 2, MIL-101 prepared in Preparation Example 1 was used, and diethylenetriamine was used as a precursor of amino group instead of ethylenediamine used in Example 1. As in Example 1, 1 g of MIL-101 was pretreated in a vacuum oven at a temperature of 200° C. for 12 hours, and was then put in a mixed solution of 3.8 ml of diethylenetriamine (DETA) and 50 ml of toluene. Subsequently, the mixed solution was refluxed at a temperature of 110° C. for 12 hours, separated using a paper filter, and then dried in an oven at a temperature of 110° C., thereby preparing a porous organic-inorganic hybrid material (DETA-MIL-101) in which an amino group is coordinatively bonded to the coordinatively unsaturated metal sites thereof. It was found that the amino group (—$NH_2$) and ethylene group of the diethylenetriamine were present in DETA-MIL-101 using infrared spectroscopy, as shown in (c) of FIG. 1 and (c) of FIG. 2.

Example 3

Preparation of HS-MIL-101 Having Thiol Group

An organic-inorganic nanoporous material was functionalized on the coordinatively unsaturated metal sites, using the same method as in Example 1, except that the 1,2-dimercaptoethane was used as a functional group for surface functionalization. The presence the ethylene group and thiol group (—SH) were confirmed by infrared spectroscopy.

Example 4

Preparation of AMS-MIL-101 Having Both Amino Group and Sulfonic Acid Group

MIL-101 prepared in Preparation Example 1 was pretreated in a vacuum oven at a temperature of 200° C. for 12 hours, and then 0.5 g of pretreated MIL-101 was then put in a mixed solution of 0.18 g of aminomethanesulfonic acid (AMS) and 50 ml of toluene. Subsequently, the mixed solution was refluxed at a temperature of 110° C. for 12 hours while introducing nitrogen thereinto, thereby preparing an AMS-MIL-101 in which amino groups are bonded to the coordinatively unsaturated metal sites thereof and sulfonic acid is functionalized thereto. It was found that the amino group (—$NH_2$) was present in the frequency range of 3200-3400 $cm^{-1}$ and that the S=O symmetric bond was present in the frequency range of 1150 $cm^{-1}$.

Example 5

Figure 4:
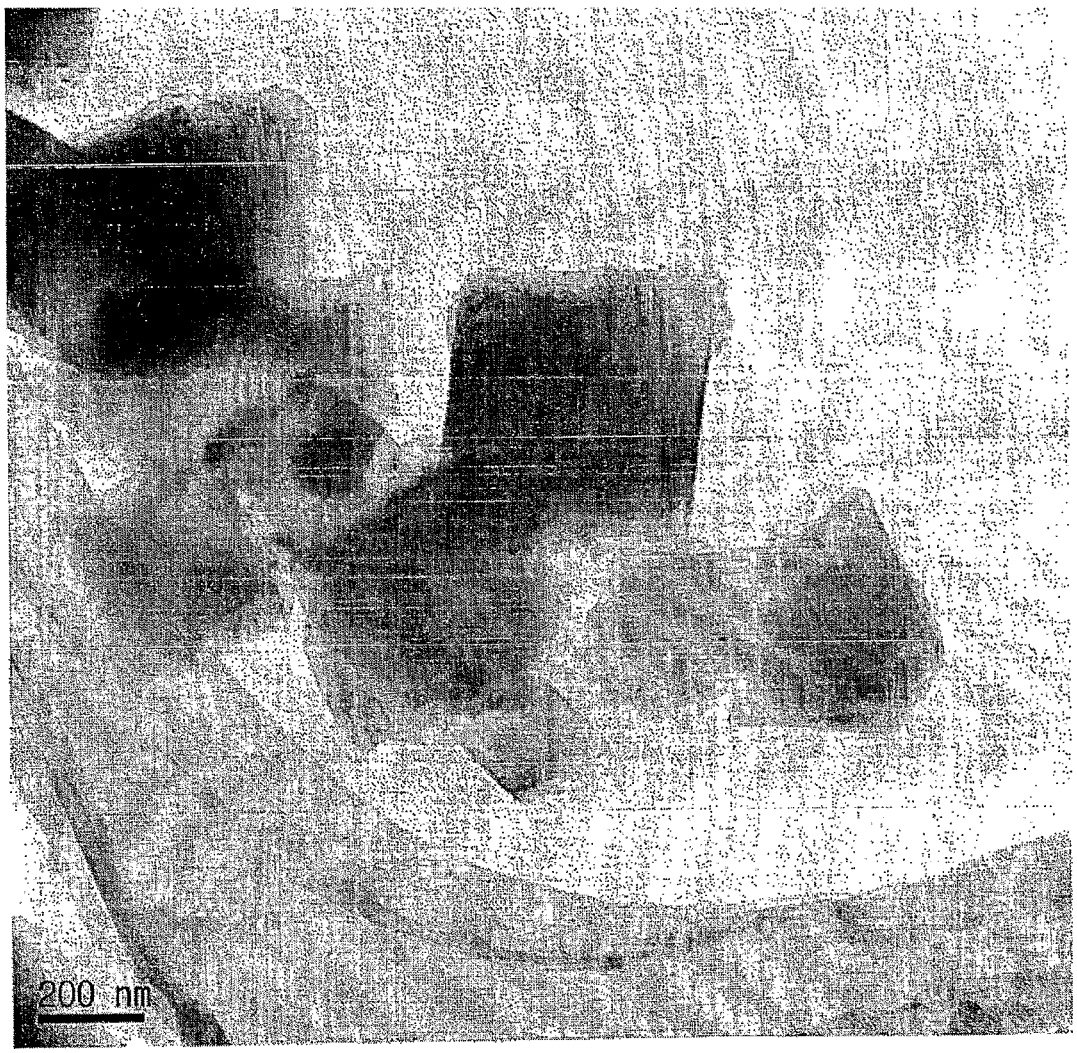
FIG. 4 is a TEM photograph showing a surface-functionalized porous organic-inorganic hybrid material (Pd-DETA-MIL-101) prepared in Example 5.
Figure 5:
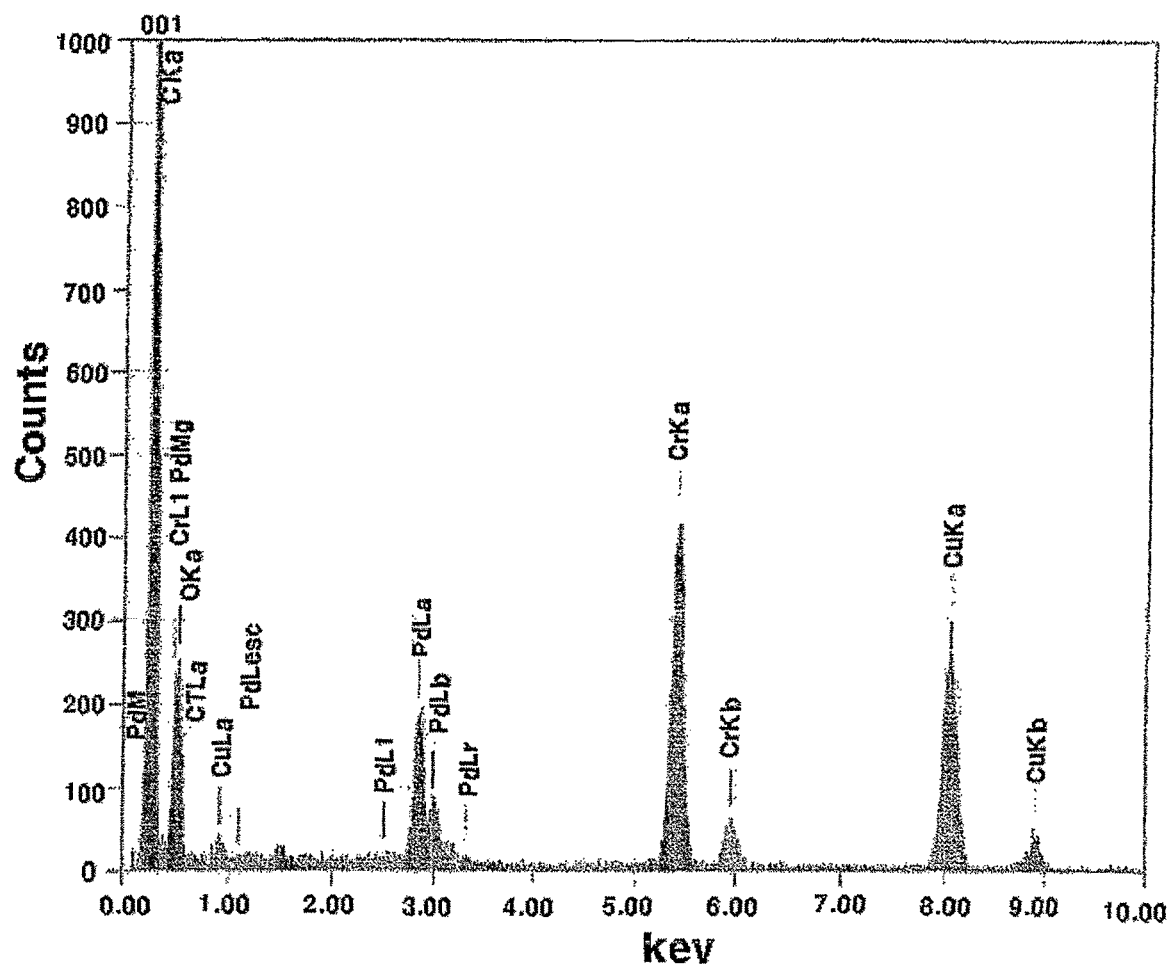
FIG. 5 is a graph showing the results of EDX element analysis of the surface-functionalized porous organic-inorganic hybrid material (Pd-DETA-MIL-101) prepared in Example 5.

Preparation of Pd-DETA-MIL-101 Supported with Palladium 1 g of DETA-MIL-101, prepared in Example 2, was vacuum-pretreated at a temperature of 150° C., and was then dispersed in a mixed solution of 0.016 g of $PdCl_2$ and 30 ml of ethanol to support the organic-inorganic hybrid material (DETA-MIL-101) with 1 wt % of palladium (Pd). Subsequently, 0.9 g of $NaBH_4$, which is a reductant, was added to the mixed solution, thereby preparing a Pd-DETA-MIL-101 supported with palladium. As the result of XRD analysis, it was found that the crystal structure of the Pd-DETA-MIL-101 was maintained even if the $NaBH_4$, which is a strong reductant, was used, as shown in FIG. 4. Further, it was found that palladium particles were distributed in the pores of MIL-101 through TEM/EDX analysis, as shown in FIG. 5.

Example 6

Preparation of Au-DETA-MIL-101 Supported with Gold

An Au-DETA-MIL-101 supported with gold was prepared using the same method as in Example 4, except that $HAuCl_4$ was used instead of $PdCl_2$. As the result of XRD analysis, it was found that the crystal structure of the Au-DETA-MIL-101 was maintained even if the $NaBH_4$, which is a strong reductant was used.

Example 7

Preparation of PWA-NH2-MIL-101 Supported with Heteropoly Anion 0.5 g of ED-MIL-101 prepared in Example 1 was mixed with PWA (10 ml of 0.01M $H_3PW_{12}O_{40}\cdot12H_2O$, MWPW=2882), and was then stirred at room temperature for 12 hours, thereby preparing an organic-inorganic hybrid material (PWA-$NH_2$-MIL-101) supported with a heteropoly anion via the ionic bond of the heteropoly anion and an $NH_3^+$-MIL-101 cation. As the result of ICP analysis, it was found that the prepared PWA-$NH_2$-MIL-101 was supported with 50 wt % of PWA.

Example 8

Preparation of $HO_3$S-MIL-101 Functionalized with Sulfonic Acid Group

A MIL-101 was prepared using the same method as in Example 1, which amino groups are bonded to the coordinatively unsaturated metal sites thereof and sulfonic acid is functionalized by refluxing the mixed solution, except that 4-aminobenzenethiol (ABT) is used as an amphoteric functional group. It was found that the amino group (—$NH_2$) was present in the frequency range of 3200-3400 $cm^{-1}$ and that the S=O symmetric bond was present in the frequency range of 1150 $cm^{-1}$.

Example 9

Base Catalytic Reaction

A Knoevenagel condensation reaction, which is a base catalytic reaction in which ethyl trans-a-cyanocinnamate is formed using benzaldehyde (BZA, 10 mmol) and ethyl cyanoacetate (ECA) as reactants, was conducted using the porous organic-inorganic hybrid material ($NH_2$-MIL-101) obtained in Example 2, Example 3 and Preparation Example 2, which includes an aminosilane functional group and is coordinated with an alkoxy group. The results of the reaction are given in Table 1. As given in Table 1, it was found that the reaction product has excellent activity as a base catalyst, compared to the APS-SBA-15, which is pretreated at a temperature of 150° C. and thus surface-functionalized in Preparation Example 2.

TABLE 1

Comparison of catalytic activity in Knoevenagel condensation reaction

| Sample | Surface area ($m^2$/g) | Yield (%)$^a$ | TOF$^b$($h^{-1}$) |
|---|---|---|---|
| Example 2 | 2216 | 97.7 | 370.5 |
| Example 3 | 1792 | 97.7 | 211.7 |
| Preparation Example 2 | 340 | 73.3 | 32.1 |

$^a$conversion ratio of ECA: reaction time 16 hr, amount of catalyst 20 mg
$^b$TOF (Turnover Frequency): product (mole)/catalyst (mole), reaction time 20 min

Example 10

Catalytic Reaction Using Precious Metal

A C—C bond formation reaction (Heck reaction), in which trans-stilbene is formed using iodobenzene and styrene, was conducted using the Pd—$NH_2$-MIL-101 supported with palladium, obtained in Example 5. As the results of the reaction, it was found that the reaction product has at least two times higher catalytic activity of the Pd-APS-SBA-15 in the C—C bond formation reaction because the coordinatively unsaturated metal sites thereof are functionalized with palladium.

Example 11

Acid Catalytic Reaction

An esterification reaction, in which ethyl acetate is formed using acetic acid (0.03 mol) and ethanol (0.3 mol) as reactants through an acid catalytic reaction, was conducted using 0.05 g of AMS-MIL-101 obtained in Example 4. As the result of the reaction, it was found that the reaction product has at least three times higher catalytic activity of the MIL-101 of Preparation Example 1 in the esterification reaction because the coordinatively unsaturated metal sites thereof are functionalized with acidic functional groups.

Example 12

Preparation of Porous Organic-Inorganic Hybrid Material (Mil-101) Thin Film Functionalized with Amino Group $Cr(NO_3)_3 \cdot 9H_2O$, an aqueous HF solution and 1,4-benzenedicarboxylic acid (BDCA) were put into a Teflon reactor, and then distilled water was added thereinto so that the final molar ratio of the reactant mixture is $Cr:HF:BDCA:H_2O=1:1:1:275$. Thereafter, an alumina substrate was aligned perpendicular to the mixed solution, and then the Teflon reactor including the reactant mixture and the alumina substrate was mounted in a microwave reactor (manufactured by CEM Ltd., Mars-5) and then irradiated with microwaves for 3 minutes to increase the temperature of the reactant mixture to 180° C. Subsequently, the reactant mixture was left at a temperature of 180° C. for 30 minutes to react, was cooled to room temperature, was cleaned using distilled water, and was then dried, thereby obtaining the organic-inorganic hybrid material (MIL-101) thin film. The X-ray diffraction patterns (XRD patterns) of the obtained MIL-101 thin film corresponded to those of the conventional powder synthesis research (Science 2005, 309, 2040), in which the MIL-101 is synthesized in an electric oven at a temperature of 220° C. for 10 hours. The MIL-101 thin film was perpendicularly fixed to the bottom of a reflux reactor in which a mixed solution of 1 ml of 3-aminopropyltriethoxysilane (APS) and 50 ml of toluene was placed. Subsequently, the mixed solution was refluxed at a temperature of 110° C. for 12 hours, thereby preparing a porous organic-inorganic hybrid material thin film coordinated with ethoxy functional groups to the unsaturated sites thereof.

What is claimed is:

1. A method of selectively functionalizing coordinatively unsaturated metal sites of a porous organic-inorganic material comprising
reacting a porous organic-inorganic hybrid material having metal unsaturated sites with one or more selected from a group consisting of an organic substance, an inorganic substance, an ionic liquid, and an organic-inorganic substance to functionalize the unsaturated metal sites, rather than hydroxide groups, on the surface of the material to form a surface functionalized porous organic inorganic hybrid material;
or reacting a porous organic-inorganic mesoporous material having coordinately unsaturated metal sites with one or more selected from a group consisting of an organic substance, an inorganic substance, an ionic liquid, and an organic-inorganic substances to functionalize the unsaturated metal sites, rather than hydroxide groups, on the surface of the material to form a surface functionalized porous organic inorganic mesoporous material.

2. The method according to claim 1, wherein the porous organic-inorganic hybrid material is a crystalline polymer compound formed by bonding an organic ligand with a central metal ion and has a molecule-sized pore structure or a nanosized pore structure, and the organic-inorganic mesoporous material is a molecular sieve having a coordinately unsaturated metal sites formed by substitution of dissimilar metals.

3. The method according to claim 2, wherein the precursor of the central metal ion of the porous organic-inorganic hybrid material is one or more metals selected from among Ti, Zr, Hf, V, Nb, Ta, Cr, Mo, W, Mn, Re, Fe, Ru, Os, Co, Rh, Ir, Ni, Pd, Pt, Cu, Ag, Aq Zn, Cd, Hg, Mg, Ca, Sr, Ba, Sc, Y, Al, Ga, In, Tl, Si, Ge, Sn, Pb, As, Sb and Bi, or metal compounds thereof.

4. The method according to claim 2, wherein an organic material, serving as the ligand, methane dithionic acid group, a methane dithionic acid anion group, a pyridine group and a pyrazine group, or mixtures thereof.

5. The method according to claim 4, wherein the compound having the carboxylic acid is one or more selected from among benzene dicarboxylic acid, naphthalene dicarboxylic acid, benzene tricarboxylic acid, naphthalene tricarboxylic acid, pyridine dicarboxylic acid, bipyridyl dicarboxylic acid, formic acid, oxalic acid, malonic acid, succinic acid, glutaric acid, hexanedioic acid, heptanedioic acid, and cyclohexyl dicarboxylic acid.

6. The method according to claim 2, wherein the porous organic-inorganic hybrid material is in a form of a thin film a membrane, pellet, ink, extrudate, or sphere.

7. The method according to claim 1, wherein the organic substance is one or more compounds selected from among compounds represented by Formulas 1 to 3 below:

$H_2N$-M-R1  [Formula 1]

HS-M-R2  [Formula 2]

$(OH)_2OP$-M-R3  [Formula 3]

wherein M is an alkylene or aralkylene group of $C_1$~$C_{2-3}$ including or not including unsaturated hydrocarbons, and each of $R^1$, $R^2$ and $R^3$ is independently an organic alkylene or aralkylene group, unsubstituted or substituted with one or more selected from among halogen elements, a vinyl group ($-C=CH_2$), an amino group ($-NH_2$), an imino group ($-NHR^{14}$), a mercapto group ($-SH$), a hydroxyl group ($-OH$), a carboxylic acid group ($-COOH$), a sulfonic acid group ($-SO_3H$), an alkoxy group ($-OR$) and a phosphoric group ($-PO(OH)_2$).

8. The method according to claim 1, wherein the inorganic substance is polyoxometallate of $[AlO_4Al_{12}(OH)_{24}(H_2O)_{12}]_{7+}$ or $[PW_{12}O_{40}]^{4-}$, and the polyoxometallate is one or more selected from among a structure of Keggin anion $[(XM_{12}O_{40})^{n-}$, where n is an integer of 1~10; X is P, Si, H, Ga, Ge, V, Cr, Me or Fe; and M is one or more selected from among W, Mo, and Co], a structure of Lindqvist anion $[(M_6O_{19})_{n-}$, where n is an integer of 1~10; and M is W, Mo, Ta, V or W], a structure of Anderson-Evans anion $[(M_x(OH)_6 M_6O_{18})^{n-}$, where n is an integer of 1~10; Mx is Cr, Ni, Fe, or Mn; and M is Mo, or W] or $[(M_4(H_2O)_4(P_2W_{15}O_{56})_2)^{n-}$, where n is an integer of 1~10; and M is one or more transition metals or transition metal clusters selected from among Cu, Zn, Ni, Mn, and the like], and Dawson-Wells structure $(P_2W_{15}O_{56})_2$.

9. The method according to claim 1, wherein the ionic liquid is one or more salts selected from among ammonium, Phosphonium, Sulphonitun, Pyrrolidnium, Imidazolium, Thiazolium, Pyrichun and Triazolium.

10. The method according to claim 1, wherein the organic-inorganic hybrid substance is an organic metal compound, one or more selected from among compounds represented by Formulas 4 to 11 below:

$Si(OR^1)_{4-x}R_x$ ($1 \le x \le 3$)  [Formula 4]

$Si(OR^3)_{4-(y+z)}R^2{}_yZ_z$ ($1 \le y+z \le 3$)  [Formula 5]

$Si(OR^4)_{4-a}R^5{}_aSi$ ($1 \le a \le 3$)  [Formula 6]

$Z^1{}_b(OR^6)_{3-b}Si$-A-$Si(OR^7)_{3-c}Z^2{}_c$ ($0 \le b \le 2, 0 \le c \le 2$)  [Formula 7]

$R^8{}_eM^1(OR^9)_{4-e}$ ($1 \le e \le 3$)  [Formula 8]

$R^{10}{}_gM^2Z^3{}_f(OR^{11})_{4-(f+g)}$ ($1 \le f+g \le 3$)  [Formula 9]

$M^3(OR^{12})_h$ ($1 \le h \le 2$)  [Formula 10]

$M^4(OR^{13})_iZ^4{}_j$ ($1 \le i+j \le 2$)  [Formula 11]

wherein A is an alkylene or aralkylene group of $C_1\sim C_{20}$ including or not including unsaturated hydrocarbons, each of $Z^1$, $Z^2$, $Z^3$ and $Z^4$ is independently selected from among halogen elements, each of $M^1$ and $M^2$ is independently one or more elements selected from among transition metals, Lanthanides and Actinides, each of $M^3$ and $M^4$ is independently one or more elements selected from among alkali metals and alkaline earth metals, each R and $R^1$ to $R^{13}$ is independently an alkyl group, alkenyl group or alkynyl group of $C_1\sim C_{20}$, unsubstituted or substituted with one or more selected from among halogen elements, a vinyl group (—C=$CH_2$), an amino group (—$NH_2$), an imino group (—$NHR^{14}$), a mercapto group (—SH), a hydroxyl group (—OH), and a carboxylic acid group (—COOH), or is selected from among a vinyl group (—C=CH), an amino group (—$NH_2$), an imino group (—$NHR^{14}$), a mercapto group (—SH), a hydroxyl group (—OH) and a carboxylic acid group (COOH), and $R^{14}$ is an alkyl group, an alkenyl group or an alkynyl group of $C_1\sim C_{10}$, unsubstituted or substituted with halogen, an amino group, a mercapto group or a hydroxyl group.

11. The method according to claim 1, further comprising:
secondarily supporting the surface-functionalized porous organic-inorganic hybrid material with ionic liquids or inorganic polyoxometallates.

12. The method according to claim 1, further comprising:
supporting one or more metals selected from among precious metals, transition metals, typical metals and Lanthanides, or oxides thereof on the surface functionalized porous organic-inorganic hybrid material.

13. The method according to claim 12, wherein the porous organic inorganic hybrid material is chromium terephthalate, iron terephthalate, vanadium terephthalate, aluminum terephthalate, chromium benzenetricarboxylate, iron benzenetricarboxylate, vanadium benzenetricarboxylate, or aluminum benzenetricarboxylate.

14. A surface functionalized porous organic-inorganic hybrid material composition prepared using the method according to claim 1.

15. A catalyst composition comprising the surface functionalized porous organic-inorganic hybrid material prepared using the method according to claim 1.

16. The catalyst composition according to claim 15, wherein the catalyst composition is used for an acid-base reaction, hydrogenation, dehydrogenation, carbon-carbon bonding reaction, or oxidation reaction by oxygen, air or hydrogen peroxide.

* * * * *